(12) United States Patent
Sharma (10) Patent No.: US 8,498,444 B2
(45) Date of Patent: Jul. 30, 2013

(54) BLOB REPRESENTATION IN VIDEO PROCESSING

(75) Inventor: Vinay Sharma, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 297 days.

(21) Appl. No.: 12/966,798

(22) Filed: Dec. 13, 2010

(65) Prior Publication Data

US 2012/0148093 A1 Jun. 14, 2012

(51) Int. Cl.
*G06K 9/00* (2006.01)
(52) U.S. Cl.
USPC .......................................................... 382/103
(58) Field of Classification Search
USPC .......................................................... 382/103
See application file for complete search history.

(56) References Cited

U.S. PATENT DOCUMENTS

| | | | |
|---|---|---|---|
| 2003/0095707 A1 | 5/2003 | Colmenarez et al. | |
| 2006/0170769 A1* | 8/2006 | Zhou | ............................ 348/143 |
| 2009/0245573 A1 | 10/2009 | Saptharishi et al. | |
| 2010/0124274 A1 | 5/2010 | Cheok et al. | |
| 2010/0128930 A1 | 5/2010 | Liu et al. | |
| 2010/0260376 A1 | 10/2010 | Cobb et al. | |

OTHER PUBLICATIONS

Jacinto Nascimento and Jorge Marques, "Performance Evaluation of Object Detection Algorithms for Video Surveillance", IEEE Transactions on Multimedia, Aug. 2006, vol. 8, Issue 4, pp. 761-774.
Brendan Morris and Mohan Trivedi, "Improved Vehicle Classification in Long Traffic Video by Cooperating Tracker and Classifier Modules", IEEE International Conference on Advanced Video and Signal Based Surveillance, Nov. 2006, pp. 1-6.
Nik Gagvani, "Introduction to Video Analytics", EE Times Design, Aug. 22, 2008, pp. 1-9.
Shen Qiaonan and an Xeuhui, "A Target Tracking System for Applications in Hydraulic Engineering", Tsinghua Science and Technology, vol. 13, No. 51, Oct. 2008, pp. 343-347.
Kristen Grauman, "Edge Detection and Binary Image Analysis", Department of Computer Science, University of Texas at Austin, Lecture 4, Sep. 10, 2009, pp. 1-15.

* cited by examiner

*Primary Examiner* — Tom Y Lu
(74) *Attorney, Agent, or Firm* — Mirna Abyad; W. James Brady; Frederick J. Telecky, Jr.

(57) ABSTRACT

A method of processing a video sequence is provided that includes receiving a frame of the video sequence, identifying a plurality of blobs in the frame, computing at least one interior point of each blob of the plurality of blobs, and using the interior points in further processing of the video sequence. The interior points may be used, for example, in object tracking.

17 Claims, 6 Drawing Sheets

BLOB REPRESENTATION IN VIDEO PROCESSING

BACKGROUND OF THE INVENTION

In computer vision systems, "blobs", also referred to as patches or regions, are commonly used to identify and represent foreground objects in a scene, e.g., the content of a frame of a video sequence. In many such systems, a background subtraction technique is used to identify pixels that belong to foreground objects in the scene. These foreground pixels are then grouped together using connected components labeling to form the blobs, or image regions of contiguous pixels. Further, a blob is often characterized by its centroid, e.g., the average x and y position of pixels in the blob, and bounding box. The identified blobs may then be used in further analysis such as, for example, for object tracking in video analytic systems, where a unique identity for each blob in a scene is maintained. That is, given an initial assignment of labels to blobs, an object tracking technique attempts to find a correspondence between the blobs in frame $I_t$ and the blobs in frame $I_{t+1}$.

Establishing a correspondence typically involves comparing the centroid locations, bounding box sizes, etc. of the blobs in frame $I_t$ with each of the blobs in frame $I_{t+1}$. However, when two or more foreground objects appearing in a sequence of frames come in sufficiently close proximity in a frame, their corresponding blobs are merged and represented as a single blob entity with a single centroid and a single bounding box. Thus, the tracking technique may no longer be able to reliably track the two or more foreground objects in subsequent frames, even when the foreground objects are no longer in close proximity. Accordingly, improvements in blob representation are desirable.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

Certain terms are used throughout the following description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. In addition, although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

In many computer vision systems, objects to be tracked and/or otherwise analyzed, i.e., foreground objects, are located in each frame of a video sequence and are represented as blobs internally for further analysis. For tracking purposes, an identifier or label is associated with a foreground object that is to be tracked when that object first appears in a frame of the video sequence, and the tracking system attempts to maintain that id/label as the object moves in subsequent frames of the video sequence. More specifically, the tracking system attempts to map blobs in the current frame to blobs in the previous frame to track the movement of objects. As a part of this mapping, the centroids, bounding boxes, and/or other information about the blobs may be considered. Many tracking systems track objects based on the centroids of the blobs associated with the objects. A centroid of a blob is the "center of mass" of the blob and has x and y coordinates in a frame. Further, each blob has a single centroid.

Figure 1:
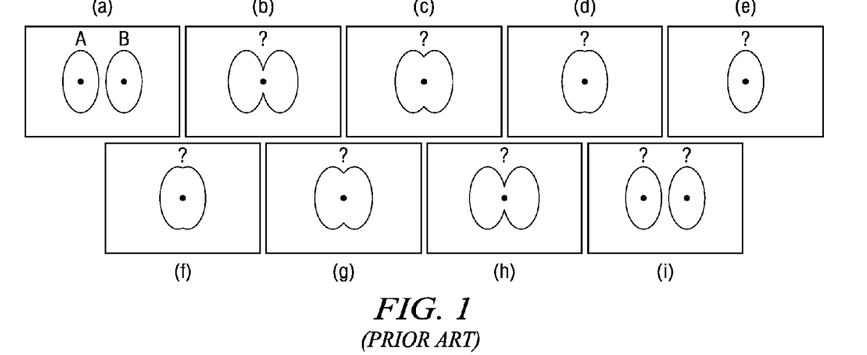
FIG. 1 shows an example of object tracking using a prior art blob representation.

The occurrence of objects that visually overlap, e.g., people or cars passing each other, may cause difficulties in tracking such objects. When blob detection is based on connected component analysis, a common technique used in blob detection, objects that touch and/or overlap in a frame result in a single merged blob with a single centroid, making it difficult to continue tracking the separate objects. Consider the simple example of FIG. 1. This figure illustrates the tracking of two moving foreground objects, i.e., objects A and B, in a sequence of video frames (a)-(i) using a prior art blob representation based on centroids. More specifically, FIG. 1 illustrates a common scenario in which two moving foreground objects being tracked eventually overlap and then separate. For example, objects A and B may be people who are approaching each other on a sidewalk or in a hallway whose paths will eventually cross. The ellipses shown in these frames are blobs representing objects A and B and the centroids of the blobs in each frame are represented as black dots.

In frame (a), two individual blobs corresponding respectively to foreground objects A and B have been detected. In frame (b), the two foreground objects have moved into sufficiently close proximity to cause blob detection to detect a single blob with a single centroid rather two individual blobs, each having its own centroid. The centroid-based tracking system applies algorithms and heuristics regarding how centroids of corresponding blobs move to keep track of the individual objects. When an event such as that of frame (b) occurs, the tracking system has to deal with an ambiguity—it does not know whether what was labeled A in frame (a) is the identity to propagate to the single blob in frame (b) or whether it should be B or whether it should be a new object C. This ambiguity continues through frames (c)-(h), i.e., as long as the two individual blobs A and B are touching other. Further, when the two foreground objects move sufficiently far apart such that blob detection will detect two individual blobs as in frame (i), the tracking system may not know which blob is A and which is B. In addition, note the displacement between the centroids of A and B in frame (a) and the single centroid in frame (b). This sudden change in location may also disrupt the spatio-temporal constraints often employed in blob-based tracking systems.

In general, embodiments of the invention provide for a blob representation that is robust to merging and splitting of blobs. More specifically, in embodiments of the invention, instead of assuming that each blob corresponds to a single foreground object and requiring a unique centroid for each blob, a blob is allowed to have multiple centers of mass, referred to as 'interior points' herein. A point in a blob is designated an interior point if, within a local region of interest, it is the farthest pixel from the edge of the blob. These interior points may then be used for further analysis, such as object tracking. Experimental results have shown that when interior points are used to track objects, when the corresponding blobs interact, e.g., touch or overlap, the relative locations of interior points of the resulting single blob as compared to the locations of the interior points of the individual blobs are affected to a much lesser degree than the relative locations of the centroids.

In one or more embodiments of the invention, interior points of a blob are computed as follows. Given a blob, a distance image is generated in which each pixel in the blob is assigned the minimum distance of that pixel to the edge (or border) of the blob. Non-maximum suppression is then applied to the distance image to identify pixels that are local maxima. Each of the pixels identified as a local maximum is designated as an interior point of the blob. In some embodiments of the invention, further criteria may be used to insure that the minimum distance value of an interior point is greater than a minimum distance threshold. The interior points computed in this way are closely related to "medial axis points", defined as the set of all points within an object that have more than one closest point to the boundary of an object. Any of the several known techniques for computing the medial axis transform can also be utilized to derive the interior points.

Figure 2:
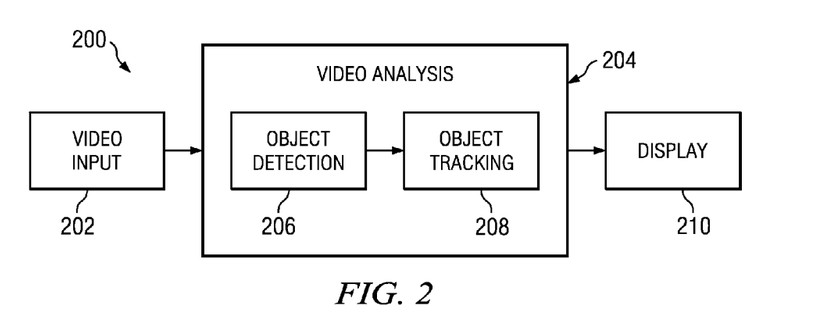
FIG. 2 shows a block diagram of a computer vision system in accordance with one or more embodiments of the invention.

FIG. 2 shows a block diagram of a computer vision system (200) in accordance with one or more embodiments of the invention. The system (200) includes a video input component (202), a video analysis component (204), a storage component (212), and a display (210). The components in the embedded vision system may be implemented in any suitable combination of software, firmware, and hardware, such as, for example, one or more digital signal processors (DSPs), microprocessors, discrete logic, application specific integrated circuits (ASICs), etc.

The video input component (202) provides a video sequence to be analyzed by the video analysis component (204). The video input component (202) may be, for example, a digital video camera, a webcam, a medical imaging device, a DVR, a DVD, a video archive, or a video feed from a video content provider. In some embodiments of the invention, the video input component (202) may generate computer graphics as the video sequence, or a combination of live video and computer-generated video. The area visible to the video input component (204) may be referred to as the "scene" and the video sequence may be a series of frames recording the scene over time. The connection between the video input component (202) and the video analysis component (204) may be a direct or indirect connection or a network connection via, for example, a local area network (LAN), a wide area network (WAN) such as the Internet, a cellular network, any other similar type of network and/or any combination thereof) through a network interface (not shown).

The video analysis component (204) receives frames of the video sequence from the video input component (202) and analyzes the received frames using various computer vision techniques to extract information relevant to the particular application of the computer vision system (200), e.g., video surveillance, people counting, etc. For example, the video analysis component (204) may be configured to analyze the frame contents to identify and classify objects in the video sequence, derive information regarding the actions and interactions of the objects, e.g., position, classification, size, direction, orientation, velocity, acceleration, and other characteristics, and provide this information for display and/or further processing.

The video analysis component (204) includes an object detection component (206) and an object tracking component (208). The object detection component (206) includes functionality to identify foreground objects in each frame of the video sequence using a method for blob detection as described herein, and to provide information about the blobs/objects to the object tracking component (208). As a part of the blob detection, embodiments of the method compute one or more interior points for each blob. The object tracking component (208) includes functionality to track objects detected in the video sequence by the object detection component (206) using the interior points and any other information regarding the detected blobs provided by the object detection component (206). The object tracking component (208) may use any suitable technique for object tracking. In some embodiments of the invention, the object tracking component (208) used an embodiment of the method for object tracking described herein.

The video analysis component (204), depending on the specific application, may perform other processing using information produced by the objection detection component (206) and the object tracking component (208). For example, the video analysis component (204) may identify objects that meet predetermined criteria, may detect specific events or activities in the video sequence based in predetermined criteria, may identify areas of interest, etc.

The display (210) receives and displays data output by the video analysis component (204). This content of the output data may vary based on the particular application of the computer vision system (200). In some embodiments of the invention, the display (200) may also show the input video sequence. The connection between the video analysis component (2042) and the display component (2104) may be a direct or indirect connection or a network connection via, for example, a local area network (LAN), a wide area network (WAN) such as the Internet, a cellular network, any other similar type of network and/or any combination thereof) through a network interface (not shown).

The various components of the computer vision system (200) may be implemented in different digital systems. For example, in one or more embodiments of the invention, the video analysis component (204) and the video input component (202) may be embodied in a single digital system, e.g., the video analysis component (204) may be implemented as software and/or hardware in a video camera, and the display may be part of a separate digital system that receives the output of the single digital system. In another example, the video analysis component (204) may be installed on a server system and may receive and process video sequences from multiple video input components. Further, an application on another system may receive the outputs of the video analysis component (200) over a network.

Figure 3A:
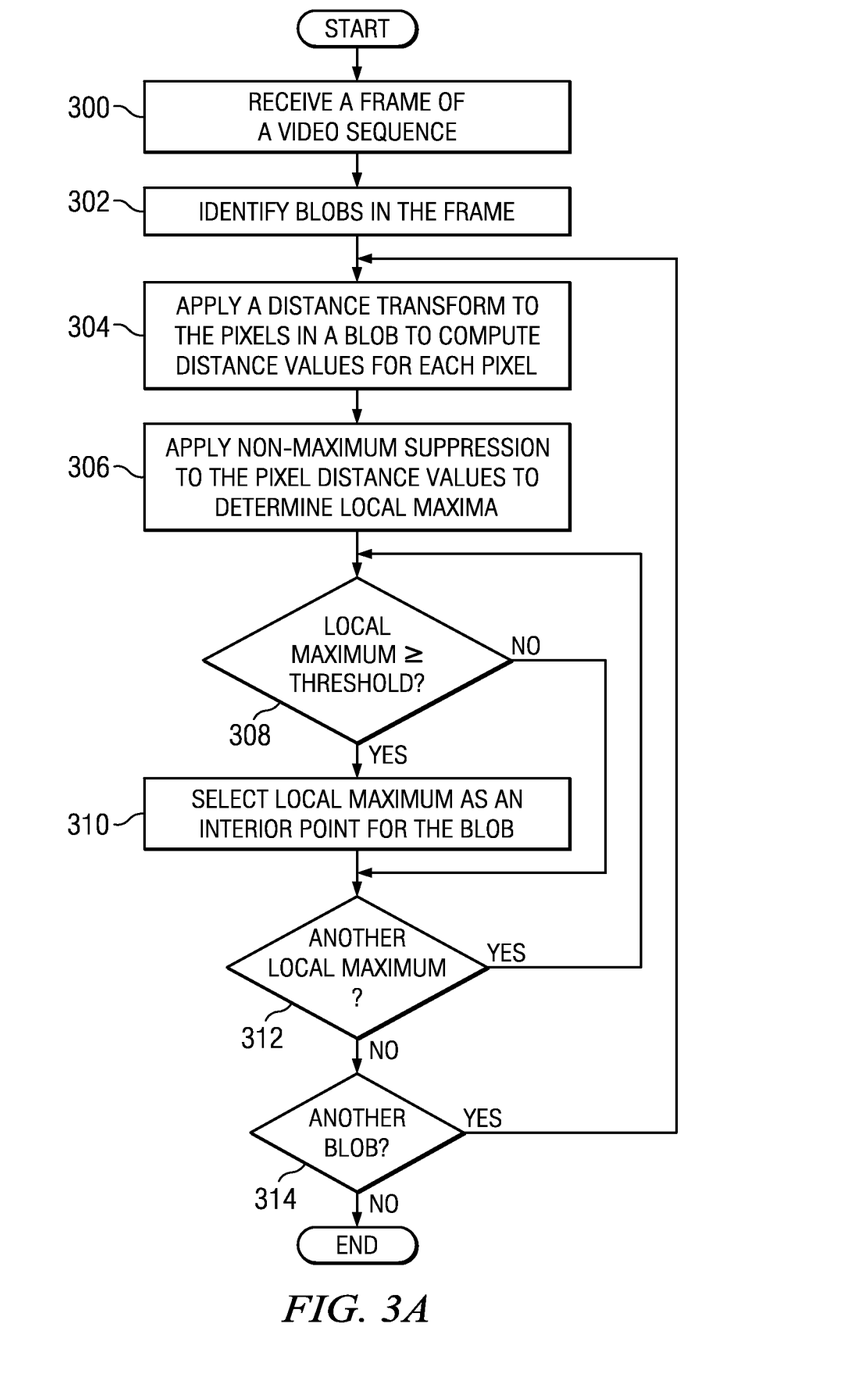
FIGS. 3A and 3B show flow diagrams of methods in accordance with one or more embodiments of the invention.

FIG. 3A shows a flow diagram of a method for computing the interior points of blobs detected in a frame of a video sequence in accordance with one or more embodiments of the invention. Initially, a frame of a video sequence is received (300). The frame may be received from a video input device, such as, for example, a digital video camera, a webcam, a medical imaging device, a DVR, a DVD, a video archive, or a video feed from a video content provider.

Blobs are then identified in the frame (302). The blobs may be identified using any suitable blob identification technique. For example, blobs may be identified as follows. First, background subtraction is performed in which a model of the background in the scene of the video sequence is "subtracted" from the frame and each pixel in the frame is classified as either a foreground or background pixel by comparing the difference to a threshold. The result is a binary image in which foreground pixels have one value, i.e., 0 or 1, and background pixels have the opposite value. Morphological filtering such as dilation and erosion may then be performed on the binary image to eliminate isolated pixels and small regions. The resulting regions of foreground pixels in the image are blobs. Each blob is then labeled by connected component analysis. In general, connected component analysis detects connected regions of foreground pixels in the binary image, i.e., blobs and assigns a unique label to each blob based on a heuristic.

Each blob is then processed to compute the interior point(s) of the blob (314). For each blob, a distance transform is applied to the pixels in the blob to compute distance value for each pixel (304). The result may be referred to as a distance transform image. For each pixel in the blob, the distance transform computes the shortest distance from a pixel in the blob, i.e., a foreground pixel, to a background pixel, and stores the computed distance value. For example, if the blob is a perfect circle, the pixels at the edges of the circle will have the smallest distance values, and the distance values will increase for pixels toward the center of the circle. In effect, if the distance values are viewed as an image, a gradual gradient will be apparent in which the pixels become brighter as you move toward the center of the circle, with the center being the brightest point as it is the most distant from the edge of the circle. Any suitable technique for computing the distance values may be used, such as Euclidean, city-block, chessboard, etc.

Non-maximum suppression is then applied to the pixel distance values to determine local maxima (306), i.e., to identify candidate interior points. In general, non-maximum suppression suppresses any pixel value in a region, e.g., zeroes out any pixel distance value, which is not the maximum value in the region. In one or more embodiments of the invention, non-maximum suppression is performed on the distance transform image using a 3×3 window to identify the candidate interior points. Any suitable technique for performing non-maximum suppression in an image may be used.

The candidate interior points are then compared against a threshold (308-312). If the pixel distance value of a candidate interior point is larger than the threshold, it is designated as an interior point of the blob. Each interior point may be represented as a triple (x, y, d), where x and y are the coordinates of the pixel location and d is the distance transform value at that pixel. Note that for some blob shapes, e.g., a circle, an ellipse, a square, there may only be one interior point, while for more irregular blob shapes there may be two or more interior points.

The value of the threshold may be a parameter that is determined based on the particular application, may be empirically determined, may be adapted during execution of an application, or a combination thereof. In some embodiments of the invention, the value of the threshold is selected to remove the candidate interior points, i.e., the points that survived non-maximum suppression, but are still too close to the blob boundary to be useful for tracking (or other processing). For example, imagine a blob shaped like an ellipse but with a long and narrow stump sticking out. The above described method, without use of the threshold, will generate interior points in the thick part of the ellipse and in the long narrow protrusion. The interior points in the long narrow protrusion may not be useful for further processing such as tracking so the threshold value may be set to attempt to eliminate the candidate interior point in the protrusion. In some embodiments of the invention, the threshold value may be set based on one or more characteristics of objects of interest in a video sequence such as size, shape, etc. For example, expected object size may be a user input in a video surveillance system. The user of the system may use an interface to indicate the expected width and height of objects in the scene under surveillance. This information may then be used to determine the threshold value. For example, if objects in a scene are known to be at least w1 pixels in width and h1 pixels in height, the threshold T can be computed as $T=0.5*\min(w1, h1)$.

Although not specifically shown, other properties of each blob may also be computed such as, for example, the area of each blob, the bounding box of each blob, and the centroid of each blob. The interior points of each blob may then be used in further processing of the frame, such as, for example, object tracking.

Figure 3B:
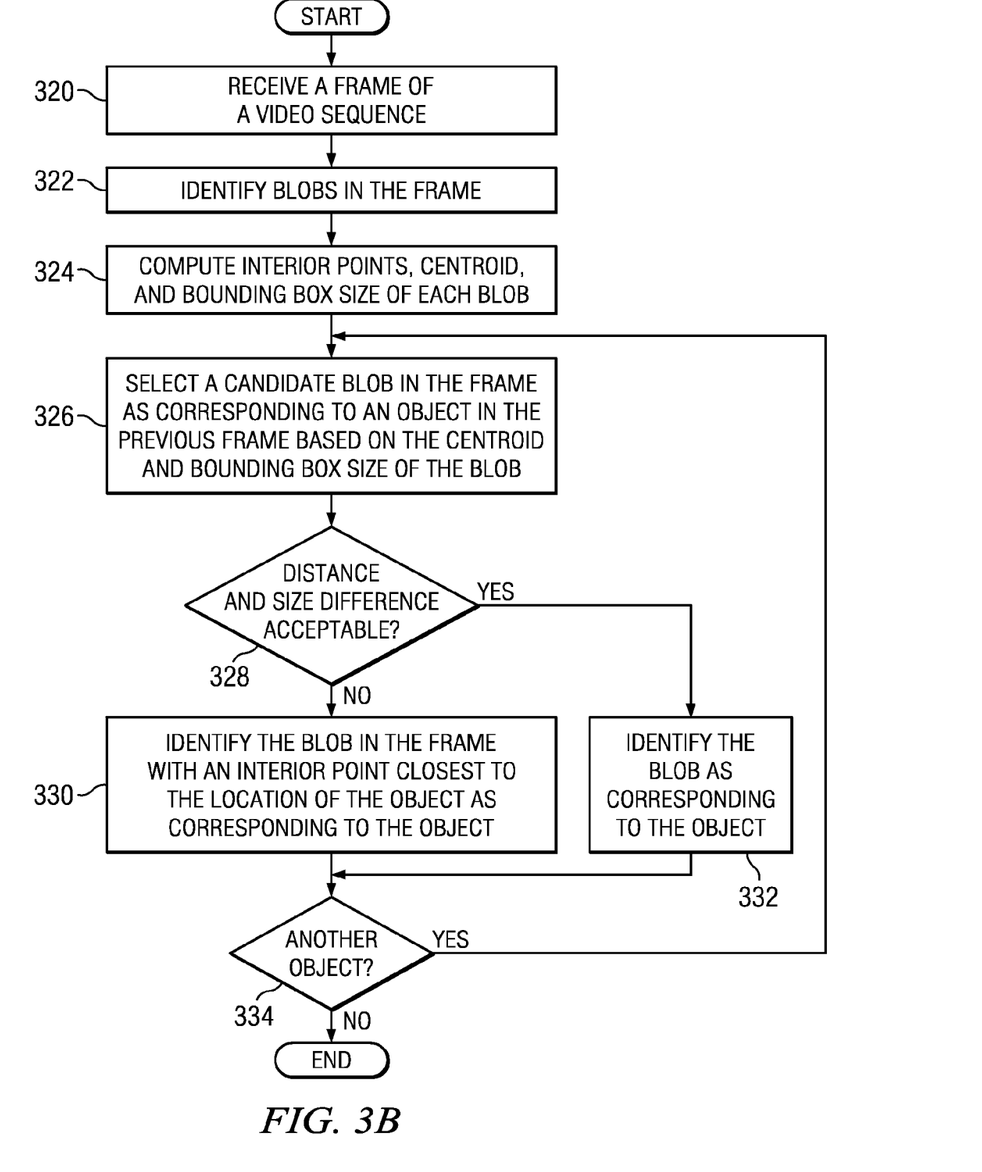

FIG. 3B shows a method for object tracking using interior points in accordance with one or more embodiments of the invention. The method description assumes that when an object appears in a scene in a video sequence the first time, the object is assigned a unique identifier that includes a label, the object location denoted by x and y coordinates of an identifying point, and the object size denoted by the horizontal and vertical distances of the identifying point to the boundary of the object. When an object first appears, the identifier is initialized as follows: the label is assigned a unique number, the object location is assigned the x and y coordinates of the blob centroid, and the object size is assigned the vertical and horizontal distances of the centroid to the edges of the bounding box of the blob. In some embodiments of the invention, the object identifier may also include the area of the bounding box.

Initially, a frame of a video sequence is received (320). The frame may be received from a video input device, such as, for example, a digital video camera, a webcam, a medical imaging device, a DVR, a DVD, a video archive, or a video feed from a video content provider. Blobs are then identified in the frame (322). The blobs may be identified using any suitable blob identification technique. Each blob is then processed to compute the interior point(s), centroid, and bounding box size of the blob (324). The interior points may be computed as described herein. The centroid and the bounding box size may be computed using any suitable technique. The bounding box size is the horizontal and vertical distance of the centroid to the bounding box of the blob.

The object identifiers from the previous frame are then updated by examining the blobs identified in the current frame and determining the best matching blobs among them (326-334). First, a candidate blob in the current frame is selected as corresponding to the object in the previous frame based on the centroid and bounding box size of the blob (326). To select the candidate blob, the distances d between the object identifier location and the centroids of the blobs in the current frame may be computed. Additionally, the percentage size differences s between the object identifier size and the bounding box sizes of the blobs in the current frame may be computed. The blob in the current frame with the smallest value of d*s may then be selected as the candidate blob.

If the distance between the object identifier location and the centroid of the candidate blob and the size difference between the object identifier and the candidate blob are acceptable (328), the candidate blob is selected as corresponding to the object identifier from the previous frame (332). That is, the identifier of the object is updated to change the location to the coordinates of the blob centroid and the size is changed to the vertical and horizontal distances of the blob centroid to the edges of the blob bounding box. If the distance and size difference is not acceptable (328), then the interior point in the current frame closest to the identifier location is selected as corresponding to the object. That is, the object identifier is updated to change the location to the coordinates of the interior point and the object size is scaled based on the distance transform value d of the interior point. To scale the size, the value of the distance transform is compared to the current horizontal distance h and the current vertical distance v of the object size to determine which of h and v are closest to d. If h is closest to d, then the horizontal distance h of the object size is set to the value of d and the current vertical distance v is scaled such that the previous ratio of h to v is maintained. If v is closest to d, then the vertical distance v of the object size is set to the value of d and the current horizontal distance h is scaled such that the previous ratio of h to v is maintained. (330) In order to eliminate abrupt changes in object location and size, any suitable smoothing technique can be used. For example, the location and size values may be updated as separate exponentially weighted moving averages.

Any suitable criteria may be used to determine if the distance and size difference are acceptable (328). For example, the determination may be based on one or more thresholds. The value(s) of the threshold(s) may be an input parameter(s), may be empirically determined, may be adapted during execution of an application, or a combination thereof. Factors considered in setting the threshold value(s) may include, for example, expected object size, expected object speed, frame rate, camera view angle, etc. Further, the threshold may be empirically determined and conditioned prior to execution of the application based on one or more of the previously listed factors. In some embodiments of the invention, the product of the distance d between the object location and the blob centroid and the percentage size difference s between the object and the centroid, d*s, is compared to a threshold value. If this product exceeds the threshold value, then the candidate blob is not found acceptable.

Figure 4:
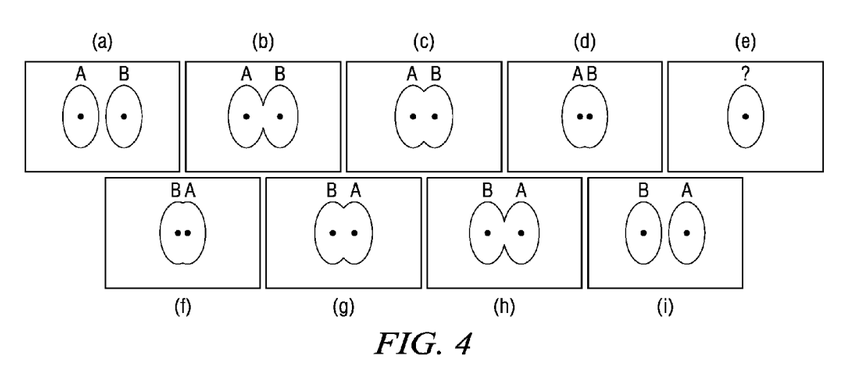
FIG. 4 shows an example of object tracking in accordance with one or more embodiments of the invention.

FIG. 4 illustrates the tracking of two moving foreground objects i.e., objects A and B, in a sequence of video frames (a)-(i) using the above described methods for interior point computation and object tracking. The example is similar to that of FIG. 1 in that the same common scenario in which two moving foreground objects being tracked eventually overlap and then separate is presented. The ellipses shown in these frames are blobs representing objects A and B and the interior points of the blobs in each frame are represented as black dots.

In frame (a), two individual blobs corresponding respectively to foreground objects A and B have been detected, and interior points computed for each one. In frame (b), the two foreground objects have moved into sufficiently close proximity to cause blob detection to detect a single blob rather two individual blobs. However, note that rather than having a single centroid as in FIG. 1, there are two interior points in the blob. That is, when the two ellipses touch in frame (b), the interior points for A and B remain largely unaffected, enabling a propagation of the object ids using, for example, a simple distance measure. That is, there is a fairly small displacement from the locations of the interior points of A and B in frame (a) to the interior points of the blob in frame (b), thus providing the object tracker a better chance of correctly propagating the object ids. This remains the case through frames (c) and (d) as the objects move closer to each other. Eventually, as shown in frame (e), the two interior points collapse to a single point, introducing an ambiguity that will need to be resolved by the object tracker. However, when the objects begin to separate, the two interior points become distinct. A comparison of FIG. 1 and FIG. 4 shows that for this scenario, using interior points results in fewer instances of ambiguity during tracking, thus facilitating better tracking performance as objects interact with each other.

Embodiments of the methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized programmable accelerators. A stored program in an onboard or external (flash EEP) ROM or FRAM may be used to implement the video signal processing. Analog-to-digital converters and digital-to-analog converters provide coupling to the real world, modulators and demodulators (plus antennas for air interfaces) can provide coupling for transmission waveforms, and packetizers can provide formats for transmission over networks such as the Internet.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor. In some cases, the software may also be sold in a computer program product, which includes the computer-readable medium and packaging materials for the computer-readable medium. Examples of computer-readable media include non-writable storage media such as read-only memory devices, writable storage media such as disks, memory, or a combination thereof.

Figure 5:
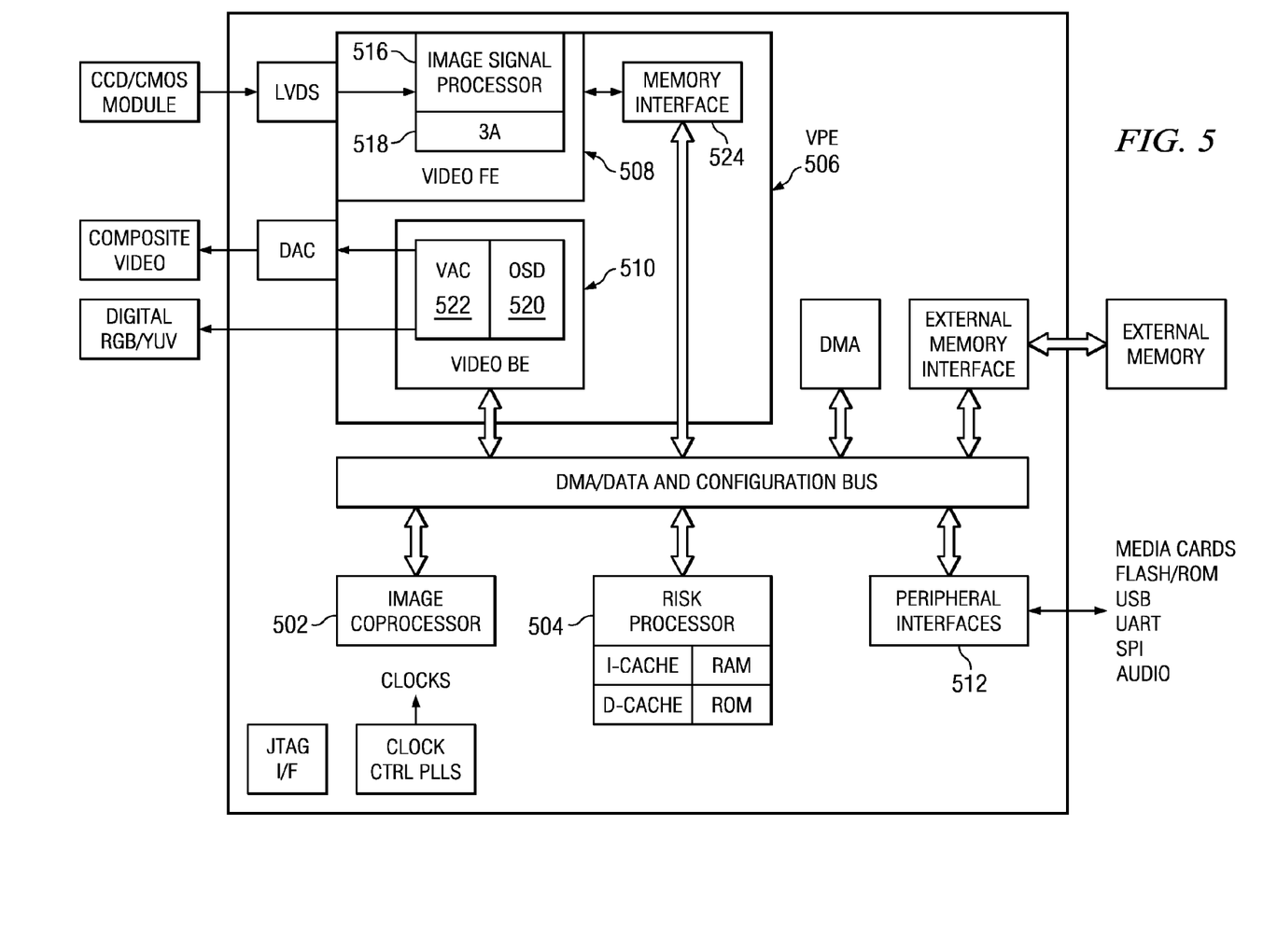
FIGS. 5-7 show illustrative digital systems in accordance with one or more embodiments of the invention.
Figure 6:
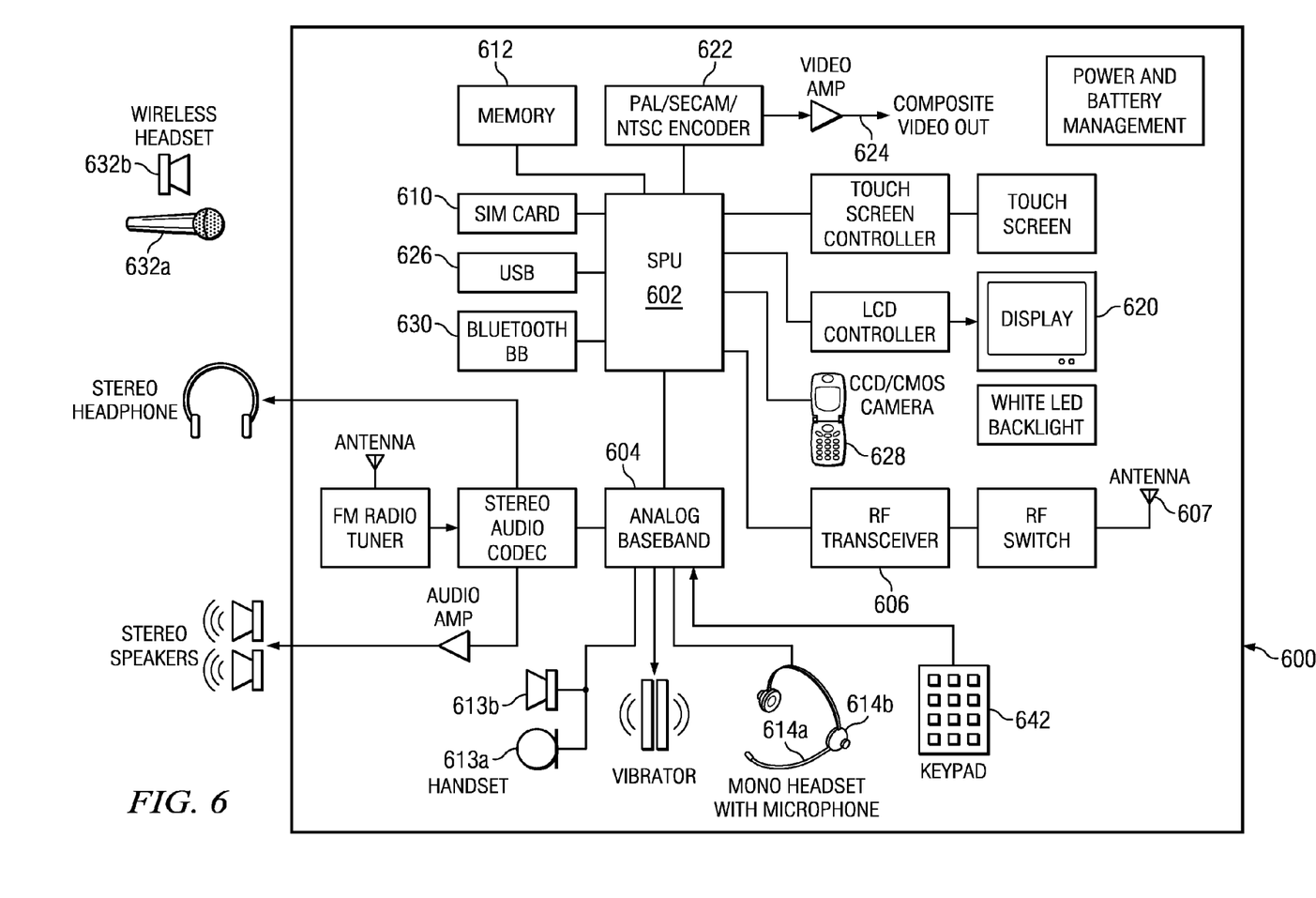
Figure 7:
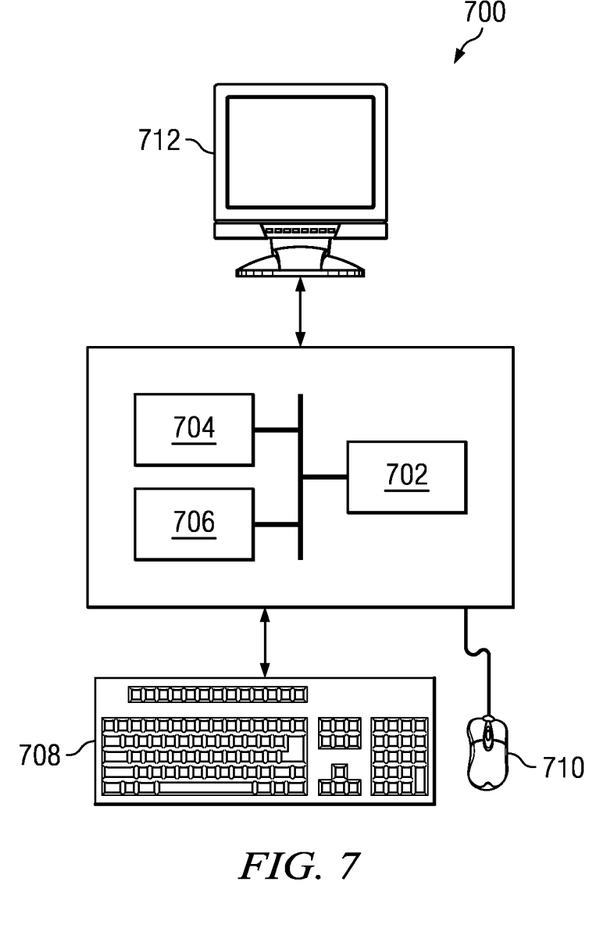

Embodiments of the methods described herein may be implemented for virtually any type of digital system (e.g., a desk top computer, a laptop computer, a medical imaging system, a video surveillance system, a vehicle navigation system, a handheld device such as a mobile (i.e., cellular) phone, a personal digital assistant, a digital camera, etc.) with functionality to receive video input. FIGS. 5-7 show block diagrams of illustrative digital systems.

FIG. 5 shows a digital system suitable for an embedded system (e.g., a digital camera) in accordance with one or more embodiments of the invention that includes, among other components, a DSP-based image coprocessor (ICP) (502), a RISC processor (504), and a video processing engine (VPE) (506) that may be configured to perform one or more of the methods described herein. The RISC processor (504) may be any suitably configured RISC processor. The VPE (506)

includes a configurable video processing front-end (Video FE) (508) input interface used for video capture from imaging peripherals such as image sensors, video decoders, etc., a configurable video processing back-end (Video BE) (510) output interface used for display devices such as SDTV displays, digital LCD panels, HDTV video encoders, etc, and memory interface (524) shared by the Video FE (508) and the Video BE (510). The digital system also includes peripheral interfaces (512) for various peripherals that may include a multi-media card, an audio serial port, a Universal Serial Bus (USB) controller, a serial port interface, etc.

The Video FE (508) includes an image signal processor (ISP) (516), and a 3A statistic generator (3A) (518). The ISP (516) provides an interface to image sensors and digital video sources. More specifically, the ISP (516) may accept raw image/video data from a sensor (CMOS or CCD) and can accept YUV video data in numerous formats. The ISP (516) also includes a parameterized image processing module with functionality to generate image data in a color format (e.g., RGB) from raw CCD/CMOS data. The ISP (516) is customizable for each sensor type and supports video frame rates for preview displays of captured digital images and for video recording modes. The ISP (516) also includes, among other functionality, an image resizer, statistics collection functionality, and a boundary signal calculator. The 3A module (518) includes functionality to support control loops for auto focus, auto white balance, and auto exposure by collecting metrics on the raw image data from the ISP (516) or external memory. In one or more embodiments of the invention, the Video FE (508) is configured to perform a method as described herein.

The Video BE (510) includes an on-screen display engine (OSD) (520) and a video analog encoder (VAC) (522). The OSD engine (520) includes functionality to manage display data in various formats for several different types of hardware display windows and it also handles gathering and blending of video data and display/bitmap data into a single display window before providing the data to the VAC (522) in YCbCr format. The VAC (522) includes functionality to take the display frame from the OSD engine (520) and format it into the desired output format and output signals required to interface to display devices. The VAC (522) may interface to composite NTSC/PAL video devices, S-Video devices, digital LCD devices, high-definition video encoders, DVI/HDMI devices, etc.

The memory interface (524) functions as the primary source and sink to modules in the Video FE (508) and the Video BE (510) that are requesting and/or transferring data to/from external memory. The memory interface (524) includes read and write buffers and arbitration logic.

The ICP (502) includes functionality to perform the computational operations required for compression and other processing of captured images. The video compression standards supported may include one or more of the JPEG standards, the MPEG standards, and the H.26x standards. In one or more embodiments of the invention, the ICP (502) is configured to perform the computational operations of methods as described herein.

In operation, to capture an image or video sequence, video signals are received by the video FE (508) and converted to the input format needed to perform video compression. Prior to the compression, a method(s) as described herein may be applied as part of processing the captured video data. The video data generated by the video FE (508) is stored in the external memory. The ICP can then read the video data and perform the necessary computations to detect blobs, compute their interior points and track objects. The video data is then processed based encoded, i.e., compressed. During the compression process, the video data is read from the external memory and the compression computations on this video data are performed by the ICP (502). The resulting compressed video data is stored in the external memory. The compressed video data may then read from the external memory, decoded, and post-processed by the video BE (510) to display the image/video sequence.

The RISC processor (504) may also includes functionality to perform the computational operations of methods as described herein. The RISC processor may read the video data stored in external memory by the video FE (508) and can perform the required computations and store the output back in external memory.

FIG. 6 is a block diagram of a digital system (e.g., a mobile cellular telephone) (600) that may be configured to perform methods as described herein. The signal processing unit (SPU) (602) includes a digital processing processor system (DSP) that includes embedded memory and security features. The analog baseband unit (604) receives a voice data stream from handset microphone (613a) and sends a voice data stream to the handset mono speaker (613b). The analog baseband unit (604) also receives a voice data stream from the microphone (614a) and sends a voice data stream to the mono headset (614b). The analog baseband unit (604) and the SPU (602) may be separate ICs. In many embodiments, the analog baseband unit (604) does not embed a programmable processor core, but performs processing based on configuration of audio paths, filters, gains, etc being setup by software running on the SPU (602). In some embodiments, the analog baseband processing is performed on the same processor and can send information to it for interaction with a user of the digital system (600) during a call processing or other processing.

The display (620) may also display pictures and video streams received from the network, from a local camera (628), or from other sources such as the USB (626) or the memory (612). The SPU (602) may also send a video stream to the display (620) that is received from various sources such as the cellular network via the RF transceiver (606) or the camera (626). The SPU (602) may also send a video stream to an external video display unit via the encoder (622) over a composite output terminal (624). The encoder unit (622) may provide encoding according to PAL/SECAM/NTSC video standards.

The SPU (602) includes functionality to perform the computational operations required for processing of digital images, video compression and decompression. The video compression standards supported may include, for example, one or more of the JPEG standards, the MPEG standards, and the H.26x standards. In one or more embodiments of the invention, the SPU (602) is configured to perform the computational operations of a method(s) as described herein. Software instructions implementing the method(s) may be stored in the memory (612) and executed by the SPU (602) during image processing of a picture or video stream.

FIG. 7 shows a digital system (700) (e.g., a personal computer) that includes a processor (702), associated memory (704), a storage device (706), and numerous other elements and functionalities typical of digital systems (not shown). In one or more embodiments of the invention, a digital system may include multiple processors and/or one or more of the processors may be digital signal processors. The digital system (700) may also include input means, such as a keyboard (708) and a mouse (710) (or other cursor control device), and output means, such as a monitor (712) (or other display device). The digital system (700) may also include a video capture device (not shown) that includes circuitry (e.g., optics, a sensor, readout electronics) for capturing video sequences. The digital system (700) may be connected to a network (714) (e.g., a local area network (LAN), a wide area network (WAN) such as the Internet, a cellular network, any other similar type of network and/or any combination thereof) via a network interface connection (not shown). The digital system (700) may receive video sequences and/or pictures via the network, via the video capture device, and/or via a removable storage medium (e.g., a floppy disk, optical disk, flash memory, USB key, a secure digital storage card, etc.) (not shown), and process the video sequence using image processing software that includes a method(s) as described herein. Those skilled in the art will appreciate that these input and output means may take other forms.

Further, those skilled in the art will appreciate that one or more elements of the aforementioned digital system (700) may be located at a remote location and connected to the other elements over a network. Further, embodiments of the invention may be implemented on a distributed system having a plurality of nodes, where each portion of the system and software instructions may be located on a different node within the distributed system. In one embodiment of the invention, the node may be a digital system. Alternatively, the node may be a processor with associated physical memory. The node may alternatively be a processor with shared memory and/or resources.

Software instructions to perform embodiments of the invention may be stored on a computer readable medium such as a compact disc (CD), a diskette, a tape, a file, or any other computer readable storage device. The software instructions may be distributed to the digital system (700) via removable memory (e.g., floppy disk, optical disk, flash memory, USB key), via a transmission path from a computer readable medium on another digital system, etc.

While the invention has been described with respect to a limited number of embodiments, those skilled in the art, having benefit of this disclosure, will appreciate that other embodiments can be devised which do not depart from the scope of the invention as disclosed herein. For example, in some embodiments of the invention, the method of FIG. 3B may consider just the distance between the object and the candidate blob when determining whether the candidate blob corresponds to the object. Accordingly, the scope of the invention should be limited only by the attached claims. It is therefore contemplated that the appended claims will cover any such modifications of the embodiments as fall within the true scope and spirit of the invention.

What is claimed is:

1. A method of processing a video sequence, the method comprising:
   receiving a frame of the video sequence;
   identifying a plurality of blobs in the frame;
   computing at least one interior point of each blob of the plurality of blobs, wherein computing at least one interior point comprises applying a distance transform to each foreground pixel in a blob to compute a distance value for the foreground pixel, wherein the distance value is a shortest distance from the foreground pixel to a background pixel, and selecting a foreground pixel in the blob as the at least one interior point based on a comparison of the distance value of the foreground pixel to a threshold; and
   using the interior points in further processing of the video sequence.

2. The method of claim 1, further comprising:
   applying non-maximum suppression to the pixel distance values to determine local maxima prior to selecting a foreground pixel.

3. The method of claim 1, wherein using the interior points comprises tracking objects using the interior points.

4. The method of claim 3, wherein tracking objects comprises identifying a blob in the plurality of blobs as corresponding to an object in a previous frame based on proximity between a location of the object and an interior point of the blob.

5. The method of claim 4, further comprising:
   computing a centroid for each blob of the plurality of blobs; and
   wherein tracking objects further comprises:
      selecting a candidate blob in the plurality of blobs as corresponding to the object based on distance between the location of the object and the centroid of the blob;
      when the distance is acceptable, identifying the candidate blob as corresponding the object; and
      when the distance is not acceptable, identifying a blob in the plurality of blobs having an interior point closest to the location of the object as corresponding to the object.

6. The method of claim 5, wherein tracking objects further comprises selecting the candidate blob based on percentage size difference between the object and a bounding box of the blob.

7. A digital system comprising:
   a video input component configured to provide a video sequence; and
   an object detection component configured to
      receive a frame of the video sequence;
      identify a plurality of blobs in the frame;
      compute at least one interior point of each blob of the plurality of blobs and to compute at least one interior point by applying a distance transform to each foreground pixel in a blob to compute a distance value for the foreground pixel, wherein the distance value is a shortest distance from the foreground pixel to a background pixel and selecting a foreground pixel in the blob as the at least one interior point based on a comparison of the distance value of the foreground pixel to a threshold; and
      provide the interior points for use in further processing of the video sequence.

8. The digital system of claim 7, wherein the object detection component is further configured to compute at least one interior point by:
   applying non-maximum suppression to the pixel distance values to determine local maxima prior to selecting a foreground pixel.

9. The digital system of claim 7, further comprising an object tracking component configured to track objects using the interior points.

10. The digital system of claim 9, wherein the object tracking component is configured to identify a blob in the plurality of blobs as corresponding to an object in a previous frame based on proximity between a location of the object and an interior point of the blob.

11. The digital system of claim 10,
   wherein the object detection component is further configured to compute a centroid for each blob of the plurality of blobs, and
   wherein the object tracing component is further configured to:
      select a candidate blob in the plurality of blobs as corresponding to the object based on distance between the location of the object and the centroid of the blob;
      when the distance is acceptable, to identify the candidate blob as corresponding the object; and when the distance is not acceptable, to identify a blob in the plurality of blobs having an interior point closest to the location of the object as corresponding to the object.

12. The digital system of claim 11, wherein the object tracking component is further configured to select the candidate blob based on percentage size difference between the object and a bounding box of the blob.

13. A non-transitory computer readable medium comprising executable instructions to cause a digital system to perform a method processing a video sequence, the method comprising:

receiving a frame of the video sequence;

identifying a plurality of blobs in the frame;

computing at least one interior point of the blob, wherein computing at least one interior point comprises applying a distance transform to each foreground pixel in a blob to compute a distance value for the foreground pixel, wherein the distance value is a shortest distance from the foreground pixel to a background pixel and selecting a foreground pixel in the blob as the at least one interior point based on a comparison of the distance value of the foreground pixel to a threshold; and using the interior points in further processing of the video sequence.

14. The computer readable medium of claim 13, wherein the method further comprises:

applying non-maximum suppression to the pixel distance values to determine local maxima prior to selecting a foreground pixel.

15. The computer readable medium of claim 13, wherein using the interior points comprises tracking objects using the interior points.

16. The computer readable medium of claim 15, wherein tracking objects comprises identifying a blob in the plurality of blobs as corresponding to an object in a previous frame based on proximity between a location of the object and an interior point of the blob.

17. The computer readable medium of claim 16, wherein the method further comprises:

computing a centroid for each blob of the plurality of blobs; and wherein tracking objects further comprises:

selecting a candidate blob in the plurality of blobs as corresponding to the object based on distance between the location of the object and the centroid of the blob;

when the distance is acceptable, identifying the candidate blob as corresponding the object; and when the distance is not acceptable, identifying a blob in the plurality of blobs having an interior point closest to the location of the object as corresponding to the object.

* * * * *